United States Patent Office 2,877,096
Patented Mar. 10, 1959

2,877,096

PURIFICATION AND SEPARATION OF PHOSPHORUS FLUORIDES

Keith Clark Brinker, Wilmington, Del., assignor to E. I. du Pont de Nemours and Company, Wilmington, Del., a corporation of Delaware No Drawing. Application December 14, 1956
Serial No. 628,230

7 Claims. (Cl. 23—205)

The present invention relates to the purification and separation of phosphorus fluorides and more particularly to the purification and separation of phosphorus fluorides employing a selective absorbent.

It has been recently discovered that phosphorus pentafluoride can be employed in the preparation of tetrafluoroethylene, the monomer for polytetrafluoroethylene, a highly useful plastic. In this process phosphorus pentafluoride is heated to temperatures above 2000° C. and thereafter reacted with carbon to form completely fluorinated hydrocarbons and phosphorus trifluoride. Under certain conditions such as rapid quenching a major proportion of the fluorocarbons formed is tetrafluoroethylene. The great advantage of employing phosphorus pentafluoride is that the only by-product obtained is phosphorus trifluoride which can be regenerated to phosphorus pentafluoride by reaction with chlorine and calcium fluoride as disclosed in copending application Serial No. 541,545, filed October 19, 1955, by E. L. Muetterties, now Patent No. 2,810,629. Thus the use of phosphorus pentafluoride and phosphorus trifluoride allows the continuous preparation of tetrafluoroethylene from low cost ingredients such as calcium fluoride, chlorine, and carbon. However, the successful operation of this process depends in part on keeping the recycling phosphorus fluorides free form impurities found in the raw materials and those entering the gas stream in the regeneration of the phosphorus pentafluoride or in the formation of the tetrafluoroethylene. The impurities in the phosphorus trifluoride stream obtained on separation from the fluorocarbons are phosphorus oxytrifluoride, silicon tetrafluoride, hydrogen fluoride, hydrogen chloride, and minute quantities of unreacted phosphorus pentafluoride. Phosphorus trifluoride make-up obtained from such sources as the reaction of phosphorus trichloride with $CaF_2$ will introduce additional impurities such as phosphorus trichloride, phosphorus monofluorodichloride and phosphorus difluoromonochloride. The separation of phosphorus trifluoride from these impurities by distillation is difficult and expensive because of the low temperatures required for distillation, the small quantities in which the impurities are present and the close boiling points of some of the impurities and the phosphorus trifluoride.

It is therefore the object of the present invention to provide a method for purifying phosphorus trifluoride. It is another object to provide a method for separating phosphorus fluorides. It is still another object of the present invention to purify phosphorus trifluoride by absorption of fluoride impurities contained in the phosphorus trifluoride. A further object is to provide a process for the separation of phosphorus fluorides employing an absorbent capable of regeneration. Other objects will become apparent hereinafter.

The objects of the present invention are accomplished by a process which comprises passing a gaseous mixture of halides and particularly of fluorides of phosphorus, silicon and hydrogen containing substantial quantities of phosphorus trifluoride through a bed of an alkali metal fluoride at a temperature below 200° C. and recovering substantially pure gaseous phosphorus trifluoride and thereafter heating the sodium fluoride to a temperature above 200° C. and recovering the absorbed fluorides. The process of the present invention is based on the discovery that alkali metal fluorides will absorb or react with the halides of phosphorus, silicon and hydrogen with the exception of phosphorus trifluoride thus giving rise to a simple method of separating the impurities present in the phosphorus trifluoride obtained in the preparation of tetrafluoroethylene from phosphorus pentafluoride. It was further found that the fluorides absorbed by the alkali metal fluoride could be regenerated by heating to temperatures above 200° C. The regeneration of the fluorides is primarily dependent on the temperature and this phenomenon can thus be employed to separate the absorbed fluorides. Particularly surprising is the fact that alkali metal fluorides will absorb phosphorus oxytrifluoride and phosphorus pentafluoride but will not absorb phosphorus trifluoride. It was in addition discovered that purification of phosphorus trifluoride with alkali metal fluorides will effectively remove such impurities as phosphorus monochloro difluoride and phosphorus difluoromonochloride and phosphorus trichloride. The removal of these impurities occurs by the reaction of these impurities with the absorbent and leads to the formation of additional phosphorus trifluoride by exchange of halogen. The process of the present invention was furthermore found to be effective in removing hydrogen chloride from a phosphorus trifluoride stream. The chlorides, however, can not be regenerated.

The preferred alkali metal fluoride employed in the process of the present invention is sodium fluoride. The fluoride is generally employed in the form of porous pellets which are commercially available or can be prepared through heating of sodium bifluoride pellets. The porosity and particle size do not critically affect the process of the present invention although it is of course desirable to have a large surface area of the fluoride available for contact with the gas.

The temperature of the absorption column should be at temperatures below 200° C. since at higher temperatures not all of the impurities can be removed. Preferably the column is maintained in a temperature gradient since certain impurities such as hydrogen fluoride are more readily absorbed at temperatures below 100° C. whereas other impurities such as silicon tetrafluoride are more readily absorbed at temperatures between 100 and 200° C. Where a large quantity of impurities is present in the phosphorus trifluoride it was found that the heat generated by the absorption was sufficient to maintain the temperature of the bed within the desired range; however, where only small quantities of impurities need be removed external heating must be supplied to the bed.

The regeneration of the fluorides from the bed is carried out at temperatures above 200° C. The regeneration of the absorbed fluorides is dependent on the temperature thus allowing the separation of the absorbed fluorides. It was found, for example, that hydrogen fluoride was regenerated at temperatures of 200 to 300° C., silicon fluoride at temperatures of 300 to 500° C., phosphorus oxytrifluoride and phosphorus pentafluoride at still higher temperatures.

The process of the present invention is further illustrated by the following examples.

*Example I*

Into a 2" diameter, 7.5" long column containing 428 g. ⅜" sodium fluoride pellets was passed 93 g. of phosphorus trifluoride having the composition indicated hereinbelow at a rate of 3 g./min. Although no external heating was employed the temperature of the column rose to approximately 80° C. through the exothermic absorption of the fluorides in the gas stream. The phosphorus trifluoride stream obtained on one pass through the column was found to have the following composition as expressed in mole percent:

| Compounds | Before Purification, percent | After Purification, percent |
|---|---|---|
| Phosphorus trifluoride | 93.0 | 99.5 |
| Silicon tetrafluoride | 1.14 | 0.05 |
| Hydrogen fluoride | 0.18 | 0.05 |
| Phosphorus Oxytrifluoride | 0.35 | none detected |
| Hydrogen chloride | 5.23 | 0.2 |
| Carbon dioxide | 0.07 | 0.2 |

*Example II*

A mixture of 32.5 g. of phosphorus trifluoride and 2 g. of phosphorus pentafluoride was passed through 22 g. of $3/16''$ sodium fluoride pellets at a rate of 1 g./min. without external heating. Analysis of the treated gas showed that all of the phosphorus pentafluoride had been absorbed. The phosphorus pentafluoride was recovered by heating to 600° C.

*Example III*

Through a 2" diameter column containing 500 g. of commercially available sodium fluoride pellets, which was maintained over a temperature gradient of 200° C. at the inlet end of the column to 80° C. at the outlet end of the column was passed 745 g. of a gas stream having the composition given below at a rate of 13 g./min. The purified gas was found to have the following composition as expressed in weight percent:

| Compounds | Before Purification, percent | After Purification, percent |
|---|---|---|
| Phosphorus trifluoride | 89.6 | 97.8 |
| Phosphorus oxytrifluoride | 1.21 | <0.01 |
| Silicon tetrafluoride | 1.62 | 0.05 |
| Hydrogen chloride | 2.16 | <0.3 |
| Phosphorus trichloride, monofluorodichloride, difluoromonochloride | 5.3 | <0.01 |

The analysis of the gases shown in the examples both prior to and after purification was carried out by mass spectrographic and infra-red methods.

Although the examples have illustrated the use of sodium fluoride only, it is to be understood that equally good results are obtained with potassium fluoride.

The process of the present invention is useful in the separation of various phosphorus fluorides as well as in the separation of other gaseous fluorides. The process is particularly useful for the purification of phosphorus trifluoride. The advantage of the present invention is that it provides a simple method to remove small quantities of impurities from phosphorus trifluoride which could not be readily removed by distillation. Another advantage is the large number of impurities absorbed by the alkali metal fluorides.

I claim:

1. A process for separating phosphorus trifluoride from a mixture of compounds of the class consisting of phosphorus chlorides and fluorides, said mixture containing a substantial amount of phosphorus trifluoride, which comprises contacting said mixture with an alkali metal fluoride at a temperature below 200° C. and recovering essentially pure phosphorus trifluoride.

2. The process as set forth in claim 1 wherein the alkali metal is sodium fluoride.

3. The method of separating phosphorus trifluoride from phosphorus pentafluoride which comprises contacting a mixture of said compounds with an alkali metal fluoride at a temperature below 200° C., recovering phosphorus trifluoride and thereafter heating said alkali metal fluoride to a temperature above 400° C. and recovering the phosphorus pentafluoride.

4. A process for separating phosphorus trifluoride from phosphorus halides which comprises contacting a mixture of compounds of the class consisting of phosphorus chlorides and fluorides, said mixture containing a substantial amount of phosphorus trifluoride, with an alkali metal fluoride at a temperature below 200° C., recovering a stream of essentially pure phosphorus trifluoride, and thereafter heating the alkali metal fluoride to a temperature above 400° C. and regenerating the alkali metal fluoride.

5. The process as set forth in claim 4 wherein the mixture of phosphorus chlorides and fluorides is a mixture of phosphorus trifluoride and phosphorus oxytrifluoride.

6. The process as set forth in claim 4 wherein the mixture of phosphorus chlorides and fluorides is a mixture of phosphorus trifluorides and phosphorus trichloride.

7. The process as set forth in claim 4 wherein the phosphorus of the mixture of phosphorus chlorides and fluorides is trivalent.

References Cited in the file of this patent

UNITED STATES PATENTS 2,426,557    Long et al. _____ Aug. 26, 1947